(12) United States Patent
Ohyama et al.

(10) Patent No.: US 9,189,194 B2
(45) Date of Patent: Nov. 17, 2015

(54) DISPLAY DEVICE THAT SEPARATELY CONTROLS FIRST AND SECOND DISPLAY WINDOWS FOR INDICATING CONNECTION STATUSES OF PLURALITY OF INSTRUMENTS ON DISPLAY DEVICE

(71) Applicant: Azbil Corporation, Tokyo (JP)

(72) Inventors: Hiroshi Ohyama, Tokyo (JP); Naoyuki Akai, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 6 days.

(21) Appl. No.: 14/163,082

(22) Filed: Jan. 24, 2014

(65) Prior Publication Data

US 2014/0215101 A1 Jul. 31, 2014

(30) Foreign Application Priority Data

Jan. 25, 2013 (JP) ................................. 2013-011775

(51) Int. Cl.
*G06F 3/14* (2006.01)
*G09G 5/14* (2006.01)
*G09G 5/397* (2006.01)

(52) U.S. Cl.
CPC .. *G06F 3/14* (2013.01); *G09G 5/14* (2013.01); *G09G 5/397* (2013.01); *G09G 2320/0693* (2013.01); *G09G 2360/125* (2013.01)

(58) Field of Classification Search
CPC .................................... G06F 3/14; G09G 5/14
USPC .................................. 710/14–19, 72; 700/17
See application file for complete search history.

(56) References Cited

U.S. PATENT DOCUMENTS

| 7,848,827 | B2 * | 12/2010 | Chen ............................... 700/19 |
| 8,390,150 | B2 * | 3/2013 | Vande Vusse et al. ........ 307/130 |
| 2007/0233283 | A1 * | 10/2007 | Chen ............................... 700/17 |
| 2008/0114911 | A1 * | 5/2008 | Schumacher ................... 710/72 |
| 2012/0004741 | A1 | 1/2012 | Suzuki |

FOREIGN PATENT DOCUMENTS

JP 2012-014388 A 1/2012

* cited by examiner

*Primary Examiner* — Tammara Peyton
(74) *Attorney, Agent, or Firm* — Troutman Sanders LLP

(57) ABSTRACT

A displaying device includes a first storing portion that stores first connection data indicating connection statuses of a plurality of instruments and a controlling system, a second storing portion that stores second connection data indicating connection statuses of a plurality of instruments and an instrument controlling device, a displaying portion that displays the first connection statuses through the first connection data and the second connection statuses through the second connection data, and a display controlling portion that causes the first connection statuses and the second connection statuses to be displayed separately on the displaying portion.

4 Claims, 6 Drawing Sheets

Background Art

Background Art

DISPLAY DEVICE THAT SEPARATELY CONTROLS FIRST AND SECOND DISPLAY WINDOWS FOR INDICATING CONNECTION STATUSES OF PLURALITY OF INSTRUMENTS ON DISPLAY DEVICE

CROSS REFERENCE TO RELATED APPLICATION

This application claims priority under 35 U.S.C. §119 to Japanese Patent Application No. 2013-011775, filed on Jan. 25, 2013, the entire content of which being hereby incorporated herein by reference.

FIELD OF TECHNOLOGY

The present invention relates to a display device for displaying a connection status of a device that is connected to a controlling system and an instrument controlling device, or the like.

BACKGROUND

Control systems are used in monitoring and control of various types of equipment ancillary to buildings, controlling plants, and the like, and instrument controlling devices are also used. See, for example, Japanese Unexamined Patent Application Publication No. 2012-014388. For example, in instrument controlling devices, signals are exchanged between field instruments, such as process instruments and various types of sensors, equipped in a work area, connected through a network such as a FieldBus, where, conventionally, mobile terminals would be used to connect directly to field instruments to set, from above, parameters for calibration, or to display diagnostic results relating to the proper operating state of a field instrument.

In systems with this type of control, a standard (an international standard) that uses an electric current value between 4 mA and 20 mA as a signal, known as a "4-20 mA" signal, is broadly used as a network for connecting instrument controlling devices and field instrument. In such a network, in the past a value of a sensor that is a field instrument, or a value between 0 and 100% for the degree of opening of a valve (a primary measurement value) were expressed through the electric current value (between 4 and 20 mA).

Moreover, at present network systems are also being developed wherein a digital signal is superimposed on an analog control signal to exchange, with the instrument controlling device, "additional information" such as secondary measurement values for the field instruments (for example, a temperature for performing temperature-pressure correction in a pressure gauge), setting parameters for the field instruments, and the like. Such network systems are known as HART (Highway Addressable Remote Transducer™) communication, where the use of instruments that are based on the HART communication standard is increasing.

Initially, the primary purpose was to set parameters for the field instruments, such as setting ranges using a HART communication compliant handheld terminal, but in recent years there has been some diversification, such as advancements and standardization regarding self-diagnostics in field instruments, and the like. For example, monitoring field instrument self-diagnostics information on an "instrument controlling station," which is added to, for example, an instrument controlling device, has also become one major objective.

In the engineering work in a controlling system or an instrument controlling device as described above, it is important to ascertain the connection status of individual field instruments. For example, as illustrated in FIG. 5, an instrument controlling device 301 and a controlling system 302 are connected to various field instruments 305. A plurality of controllers 303 are connected through a network 311 to the controlling system 302, and a plurality of I/O module signal converting devices 304 are connected to the individual controllers 303. The instrument controlling device 301 is also connected through the network 321 to the plurality of I/O module signal converting devices 304.

Moreover, a plurality of field instruments 305 are connected by signal lines 312 and signal lines 322 to the individual I/O module signal converting devices 304. Of these, each individual field instrument 305 is connected, through a signal line 312, to a route that is a device controlling instrument 302-I/O module signal converting device 303. Moreover, each individual field instrument 305 is connected, through a signal line 322, to a route that is a device controlling instrument 301-I/O module signal converting device 304. The I/O module signal converting device 304 converts between signals whereby the instrument controlling device 301 is connected by the network 321, and signals for connecting to the field instruments 305 through the signal lines 322.

The connection statuses illustrated in FIG. 5, described above, are for an integrated type wherein the instrument controlling device 301 and the controlling system 302 are configured as a single unit. In the connection statuses of the integrated type, described above, the connection status of an individual field instrument 305, when viewed from the instrument controlling device 301, and the connection status of the individual field instrument 305 when viewed from the controlling system 302 are identical. Consequently, the connection statuses of the instrument controlling device 301 and of each individual field instrument 305 can be checked using the connection diagram of the field instruments 305 used by the controlling system 302.

However, in recent years there has been an increase in the number of cases wherein the instrument controlling device is implemented afterward into a configuration with a field instrument of a controlling system wherein the instrument controlling device is not incorporated already. In such a case, as illustrated in FIG. 6, the field instruments 305 are connected to the instrument controlling device 401 through a route that is separate from the route by which the controlling system 302 and the individual field instruments 305 are connected. This is known as the "separate type" wherein the configuration is such that the connections between the instrument controlling device 401 and the field instruments 305 are separate from the connections between the controlling system 302 and the field instruments 305.

In this separate type, the plurality of controllers 303 is connected through the network 311 to the controlling system 302, where the individual controllers 303 are connected to the plurality of I/O modules 404, and the plurality of field instruments 305 is connected to the individual I/O modules 404 through the signal lines 312.

On the other hand, the signal converting device 402 is connected to the instrument controlling device 401 by the signal line 421, where each individual field instrument 305, of the plurality thereof, is connected by a signal line 422 to the signal converting device 402. Note that although omitted from the diagram, a signal line 422 is connected for each individual field instrument 305.

In such a separate type, the connection statuses of the individual field instruments 305 when viewed from the instrument controlling device 401 and the connection statuses of the individual field instruments 305 when viewed from the controlling system 302 are different. Because of this, it is not possible, in the separate type, to confirm, using the connection diagram for the field instruments 305 used by the controlling system 302, the connection statuses between the instrument controlling device 401 and the individual field instruments 305. In this way, there has been a problem in that, in the separate type wherein the instrument controlling device is incorporated afterward in a configuration wherein the controlling system and the field instruments are already connected, it is not easy to check the connection statuses between the instrument controlling device and the individual field instruments.

The present invention was created in order to solve problem areas such as set forth above, and an aspect thereof is to enable easy checking of the connection statuses of the instrument controlling device and the individual field instruments in the separate type wherein the instrument controlling device is incorporated afterward in a configuration wherein the controlling system and the field instruments are already connected.

SUMMARY

A displaying device according to the present invention includes: a first storing portion that stores first connection data indicating connection statuses of a plurality of instruments and a controlling system; a second storing portion that stores second connection data indicating connection statuses of a plurality of instruments and an instrument controlling device; a displaying portion that displays the first connection statuses through the first connection data and the second connection statuses through the second connection data; and a display controlling portion that causes the first connection statuses and the second connection statuses to be displayed separately on the displaying portion.

In the displaying device, the display controlling portion may cause the instruments in the first connection statuses and the instruments in the second connection statuses to be displayed on the displaying portion in a state wherein a first tag for identifying the instruments in the first connection data and a second tag for identifying the instruments in the second connection data are displayed.

In the display device, the first connection data may include connection information for a plurality of instruments and the controlling system through a plurality of relaying devices and the display controlling portion may cause the first connection statuses for the plurality of instruments and the controlling system, through the plurality of relaying devices, to be displayed on the displaying portion hierarchically.

In the display device, the display controlling portion may cause information regarding an instrument, selected from a plurality of instruments that are displayed in the first connection status or the second connection status, to be displayed on the displaying portion in a display area that is separate from the display area for the first connection status or the second connection status.

As explained above, the present invention has the superior effect of enabling easy checking of the connection statuses of the instrument controlling device and the individual field instruments in the separate type wherein the instrument controlling device is incorporated afterward in a configuration wherein the controlling system and the field instruments are already connected.

BRIEF DESCRIPTIONS OF THE DRAWINGS

DETAILED DESCRIPTION

Figure 1:
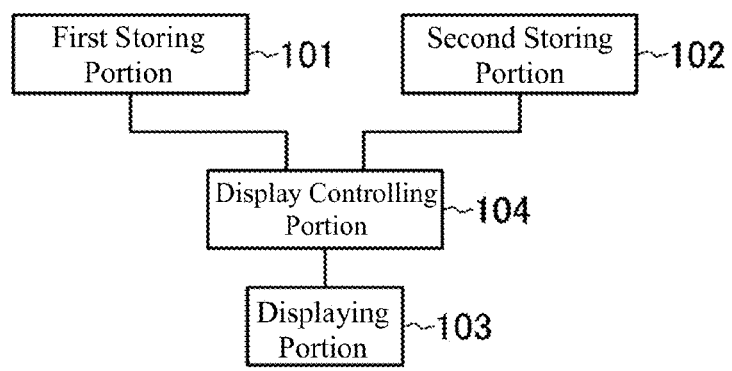
FIG. 1 is a structural diagram illustrating the structure of a display device in an example according to the present invention.

Forms for carrying out the present invention will be explained below in reference to the figures. FIG. 1 is a structural diagram illustrating the structure of a display device in an example according to the present invention. The display device includes a first storing portion 101, a second storing portion 102, a displaying portion 103, and a display controlling portion 104.

The first storing portion 101 is for storing first connection data indicating the connection statuses of the plurality of field instruments and the controlling system. The second storing portion 102 is for storing second connection data indicating the connection statuses of the plurality of field instruments and the instrument controlling device. The first connection statuses according to the first connection data, and the second connection statuses according to the second connection data, stored in this way, are displayed on the displaying portion 103. The display is performed under the control of the display controlling portion 104, where the display controlling portion 104 causes the first connection statuses and the second connection statuses to be displayed on the displaying portion 103, each separately from each other.

Figure 2:
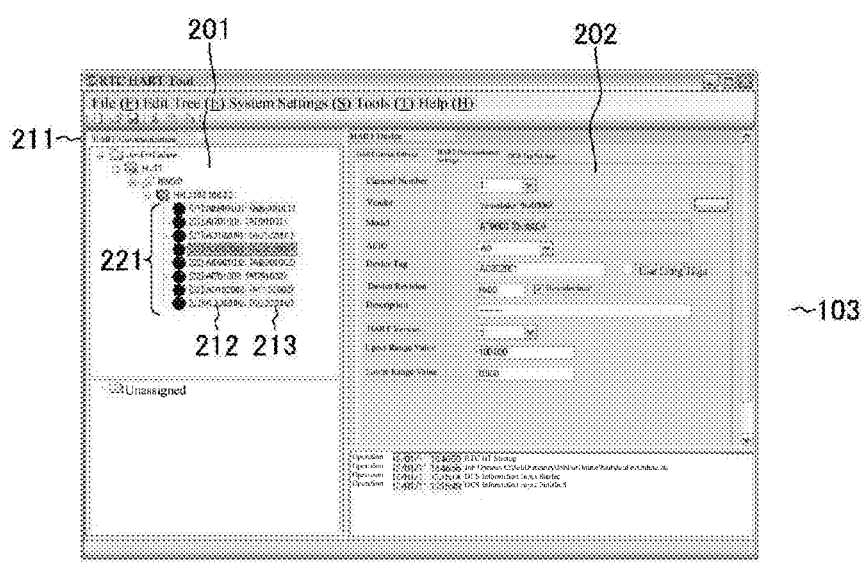
FIG. 2 is an explanatory diagram illustrating state that is displayed on a displaying portion 103.

For example, the display controlling portion 104, as illustrated in FIG. 2, displays the second connection statuses in a display area 201 of the displaying portion 103. In the example illustrated in FIG. 2, "HART Communication," which is the connection with the instrument controlling device, is selected, through a user operation, by a selecting tag 211, and the second connection statuses are displayed on in the display area 201. In the part that shows the individual field instruments 221, a first tag 212 for identifying a field instrument 221 in the first connection data, and a second tag 213 for identifying a field instrument 221 in the second connection data, are shown in this display.

As illustrated in FIG. 2, the display controlling portion 104 causes information for the field instrument 221 that is selected, from among the plurality of field instruments 221 that are displayed in the second connecting status, by a user operation to be displayed in a display area 202 that is separate from the display area 201, of the displaying portion 103. Information for each individual field instrument 221 that is required in the instrument controlling device is displayed in this display.

Figure 3:
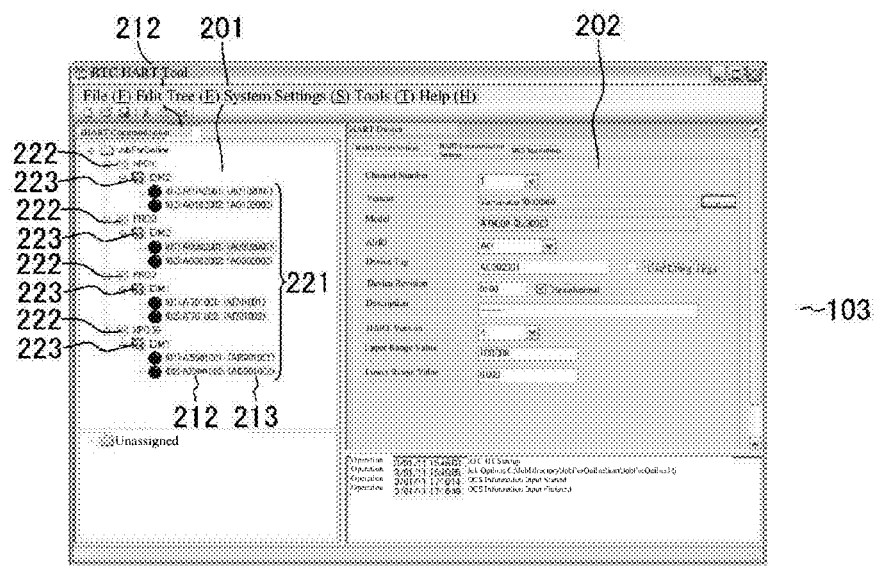
FIG. 3 is an explanatory diagram illustrating state that is displayed on a displaying portion 103.

Moreover, as illustrated in FIG. 3, for example, the display controlling portion 104 displays the first connection statuses in the display area 201 of the displaying portion 103. In the example illustrated in FIG. 3, "DCS," which is the connection with the controlling system, is selected in the selecting tag 211 through a user operation, so the first connection statuses are displayed in the display area 201. Here the first connection data includes information for a plurality of field instruments and the controlling system through a plurality of relaying devices. Because of this, the display controlling portion 104 displays the connection statuses of the plurality of field instruments 221 through the controllers 222 and the I/O modules 223, which are relaying devices, hierarchically in the display area 201. Note that even in this display, the first tag 212 for identifying the field instruments 221 in the first connection data, and the second tag 213 for identifying the field instruments 221 in the second connection data are displayed in the part that displays the individual field instruments 221.

As illustrated in FIG. 3, the display controlling portion 104 causes information for the field instrument 221 that is selected, from among the plurality of field instruments 221 that are displayed in the first connecting status, by a user operation to be displayed in a display area 202 that is separate from the display area 201, of the displaying portion 103. In this display, the information required in controlling the field instrument 221 is displayed. In the example illustrated in FIG. 3, the state is one wherein "HART Device Settings" is selected through a user operation.

Figure 4:
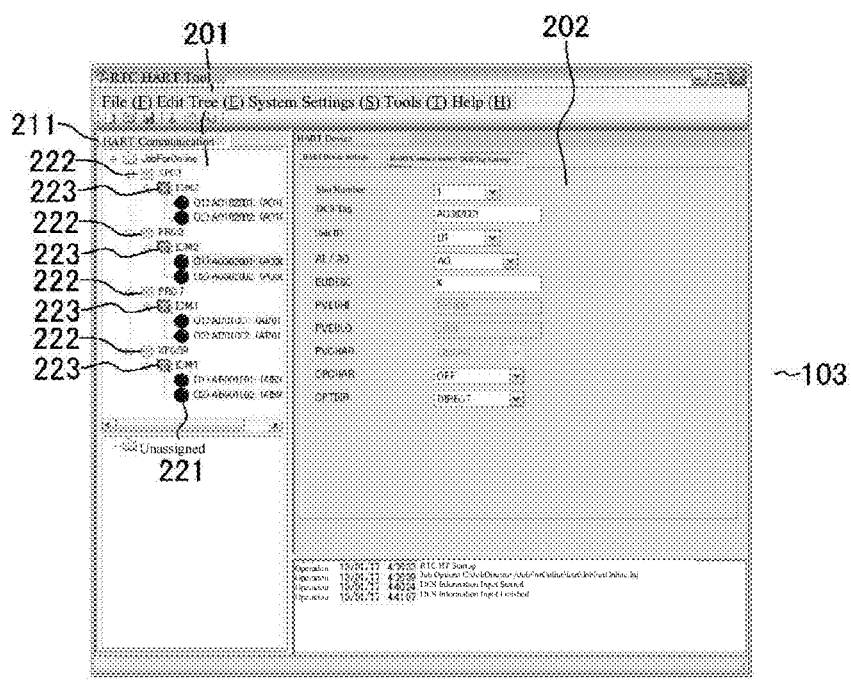
FIG. 4 is an explanatory diagram illustrating state that is displayed on a displaying portion 103.
Figure 5:
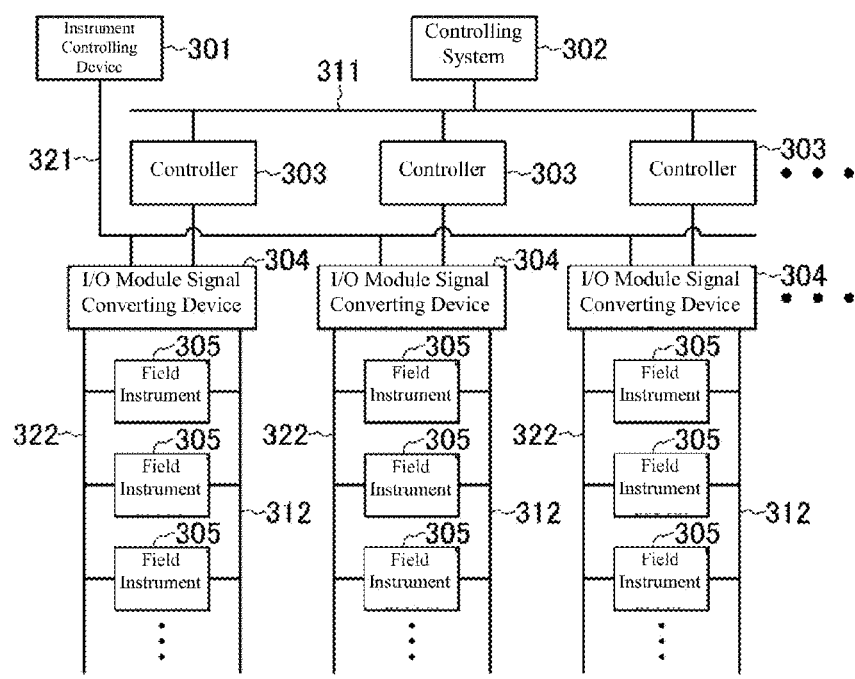
FIG. 5 is a configuration diagram illustrating the state of connection between a controlling system, and instrument controlling device, and a field instrument.
Figure 6:
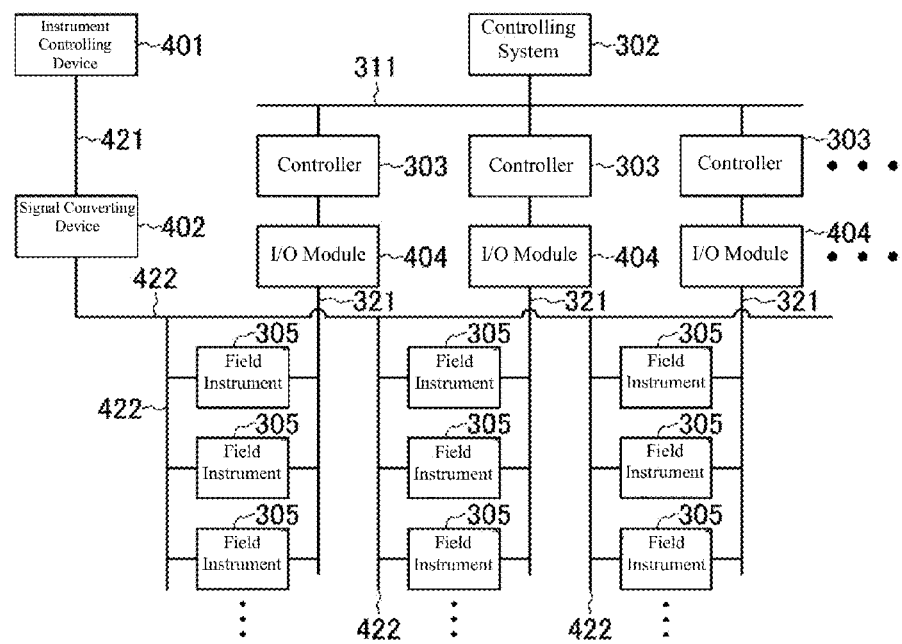
FIG. 6 is a configuration diagram illustrating the state of connection between a controlling system, and instrument controlling device, and a field instrument.

Moreover, as illustrated in FIG. 4, other information for the field instrument 221 that is selected through a user operation, from among the plurality of field instruments 221 that are displayed of the first connection statuses, can be displayed in the display area 202. In the example illustrated in FIG. 4, the state is one wherein "DCS Tag Settings" is selected through a user operation.

As explained above, in the present invention, the first connection statuses and the second connection statuses are displayed separately on the displaying portion 103 under the control of the display controlling portion 104, thus making it easy to check the connection statuses of the individual field instruments with the instrument controlling device, even in the separate type, wherein the instrument controlling device is incorporated afterward in a configuration wherein the field instruments are already connected to the controlling system.

One example of data that is stored in the first storing portion 101 will be presented next. As described above, the first connection data indicates the connection statuses of the plurality of field instruments and the controlling system. In the controlling system, a plurality of controllers is connected, and a plurality of I/O modules is connected to each individual controller, and a field instrument is connected to each I/O module. The field instrument is a sensor or valve, or a functional block for performing control, such as PID.

A point tag, for identifying the field instrument, information (first connection data) indicating the connection status, such as the controller number, I/O module number, slot number, and the like, electric current value/industrial unit converting data for the value, alarm threshold data, and other data processing information is defined for each of the respective field instruments. The data used for controlling the field instruments by the controlling system is stored in the first storing portion 101. The first connection statuses are generated from the first connection data indicating the connection statuses as described above.

Data that is used by the instrument controlling device is stored in the second storing portion 102. For example, a definition for the IP address of the level above the communication module, the vendor name for the field instrument, the type of field instrument, the HART version, and other environment setting data for the field instrument, are stored for each individual field instrument, for example. Here a plurality of field instruments is connected directly to a HART signal converting device that is used paired with an instrument controlling device so that, in the instrument controlling device, the fact that information for a field instrument is stored in the second storing portion 102 itself is second connection data.

Note that the present invention is not limited to the example set forth above, but rather, of course, many changes and combinations can be made by one of ordinary skill in the art, within the range of the technical concept of the present invention.

The invention claimed is:

1. A displaying device for a separate controlling system that is provided with connections between a controlling system and a plurality of instruments separately structured from connections between an instrument controlling device and the instruments, the displaying device comprising:
    A first storing portion that stores first connection data indicating connection statuses of the plurality of instruments and the controlling system;
    a second storing portion that stores second connection data indicating connection statuses of the plurality of instruments and the instrument controlling device;
    a displaying portion that displays the first connection statuses through the first connection data and the second connection statuses through the second connection data; and
    a display controlling portion that causes one of the first connection statuses and the second connection statuses to be selectable and causes the connections statuses of the selected one of the first connection statuses and the second connection statuses to be displayed separately on the displaying portion.

2. The display device as set forth in claim 1, wherein:
the display controlling portion causes the instruments in the first connection statuses and the instruments in the second connection statuses to be displayed on the displaying portion in a state wherein a first tag for identifying the instruments in the first connection data and a second tag for identifying the instruments in the second connection data are displayed.

3. The display device as set forth in claim 1, wherein:
the first connection data includes connection information for a plurality of instruments and the controlling system through a plurality of relaying devices; and
the display controlling portion causes the first connection statuses for the plurality of instruments and the controlling system, through the plurality of relaying devices, to be displayed on the displaying portion hierarchically.

4. The display device as set forth in claim 1, wherein:
the display controlling portion causes information regarding an instrument, selected from a plurality of instruments that are displayed in the first connection status or the second connection status, to be displayed on the displaying portion in a display area that is separate from the display area for the first connection status or the second connection status.

* * * * *